Sept. 15, 1931.  A. L. SMITH  1,823,477
DOUBLE ACTION HULL EXTRACTOR
Filed Aug. 10, 1929
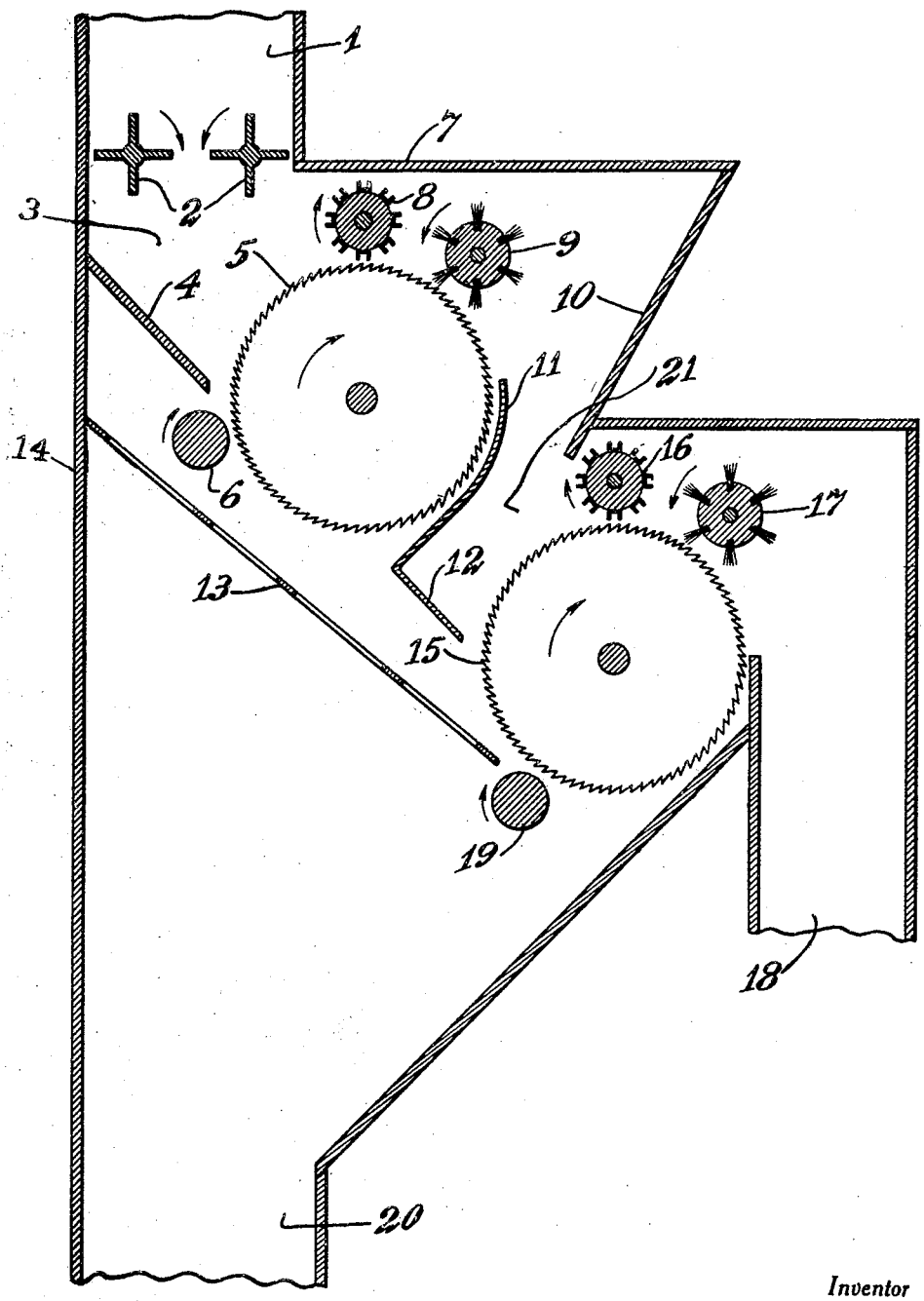
Inventor
A. L. Smith
By Johnston & Jennings
Attorneys Patented Sept. 15, 1931

1,823,477

UNITED STATES PATENT OFFICE

ALGERNON L. SMITH, OF BIRMINGHAM, ALABAMA, ASSIGNOR TO CONTINENTAL GIN COMPANY

DOUBLE ACTION HULL EXTRACTOR

Application filed August 10, 1929. Serial No. 384,908.

My invention relates to cotton hull extractors and the like in which the seed cotton mixed with hulls, trash and foreign matter is received and acted upon by successive cleaning and hull extracting mechanisms.

My invention is distinguished by the adaptation of the same hull extracting mechanisms to act twice on both the hulls and the seed cotton, whereby a freer discharge of the hulls past the first or initial mechanism is permissible without undue loss of cotton resulting when the hulls after the successive treatments are finally discharged.

More particularly, my invention contemplates utilizing a plurality of hull extracting agencies preferably two saw assemblies, and causing both the seed cotton and the hulls, separated by the initial saw assembly, to move by separate paths to the other saw assembly which is adapted to give such hulls a second cleaning before they are discharged.

My invention also contemplates conducting the hulls in their passage from the first to the second saw assembly, over a screen or grid hull board which will permit the hull particles entirely free of cotton and the dirt and small trash to escape directly and without retreatment by the second saw assembly.

As illustrative of a suitable embodiment of my invention, attention is called to the accompanying drawings which show my improved type of hull extractor in vertical transverse cross section.

The material to be treated, such as seed cotton, enters the machine through the inlet 1 and is acted upon by feed rollers 2 which deliver it into the roll chamber 3 where it is directed by the inclined hull board 4 toward the saw or equivalent device 5 of the initial hull extracting agency. A hull feed roller 6 is disposed below the opening between the hull board 4 and saw 5 and rotates clockwise to carry hulls and cotton falling thereon over towards and into engagement with the saw 5 which also rotates clockwise.

Overhead, between the saw 5 and the top 7 of the casing, I provide a stripper roller 8 which is driven clockwise and acts to knock back the hulls adhering to the cotton that is carried over by the saw teeth. The doffing brush 9 removes the seed cotton from saw 5 and it passes down between the inclined casing wall 10 and a guard 11 extending from side to side of the machine and curved to conform closely to the curvature of the juxtaposed saw cylinder 5. The lower end of the guard 11 is bent away from the saw 5 to form the hull board 12 which is located above a hull board 13 formed preferably by a screen or grid which is inclined downwardly from the casing wall 14 and serves to direct hulls, escaping between the hull board 4 and roller 6 and between the hull board 12 and saw cylinder 15, into contact with the saw 15 of the second saw assembly.

The saw 15 is disposed to receive the seed cotton passing down between the elements 10 and 11 and over hull board 12 and to again clean it, carrying the seed cotton past the stripper roller 16 to the doffing brush 17 which discharges the cleaned seed cotton into the outlet 18 leading to the gin.

The hull board 12 projects close enough to the saw 15 to prevent the seed cotton falling onto the lower hull board 13 but the latter will direct any escaping uncleaned hulls again into engagement with the saw 15.

A hull feed roller 19, corresponding to roller 6, co-acts with saw 15 and permits the cleaned hulls, not small enough to fall through the screen 13, to escape between said hull screen 13 and the roller 19. The hulls pass off through the outlet 20.

The saw 5 or an equivalent device and its coacting elements 4, 6, 8 and 9 form the first or initial saw assembly, and the saw 15 and its coacting elements 12, 13, 16, 17 and 19 form the second saw assembly. The hull board 12 permits any trash or hulls knocked back by the stripper roller 16 to pass down onto the lower screen hull board 13 and either fall therethrough or pass down to and escape between the screen hull board and roller 19.

It being understood that all elements marked with arrows rotate in the directions indicated by means of any suitable drive, (not shown), the first saw assembly will act in the manner well understood to deliver the seed cotton to the second saw assembly for retreatment before discharge into outlet 18.

But, instead of discharging all the hulls thrown off by the first saw assembly, any of the latter that are too large to fall through screen 13 or that carry locks of cotton, will slide down the screen hull board 13 and along with the hulls escaping from the treatment chamber 21 through the opening left between the saw 15 and its hull board 12, will be brought into contact with the saw 15 below its hull board 12.

It follows that any cotton adhering to the hulls will be stripped therefrom by the saw 15 and doffed by brush 17. This allows me to provide ample clearance for the hulls to escape freely from the treatment chambers 3 and 21, respectively, of the two saw assemblies, and yet will prevent such hulls finally escaping until effectively cleaned as the second treatment of the hulls escaping from the chambers 3 and 21 will be just enough to strip them of adhering cotton. With a minimum of mechanism I thus obtain double treatment of both hulls and seed cotton.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. A hull extractor for seed cotton and the like, comprising two hull extracting assemblies, means to direct the seed cotton in a stream for successive hull extracting treatment by said assemblies, and means to direct, in a path separate from the seed cotton, hulls and the like extracted by, and discharged from, the first assembly into position to be acted on by the second assembly.

2. A hull extractor for seed cotton and the like, comprising two saw assemblies having hull extracting agencies, means to direct the seed cotton into successive engagement with the hull extracting agencies of said assemblies, and means to direct, in a path separate from the seed cotton, hulls and the like discharged from both assemblies into position to be acted on by the saw of one of said assemblies.

3. In a hull extractor for seed cotton and the like, a pair of saw assemblies comprising hull extracting agencies, means to cause the seed cotton to be successively acted upon by the hull extracting agencies of said saw assemblies, and a guide adapted to catch hulls continuously ejected by the one saw assembly and direct them into position to be stripped of any cotton adhering thereto by the other saw assembly.

4. In a hull extractor for seed cotton and the like, a pair of hull extracting saw assemblies, means to cause the seed cotton to be successively acted upon by the hull extracting elements of said saw assemblies, and a screening hull board adapted to catch hulls ejected by the first saw assembly and direct them into position to be stripped of any cotton adhering thereto by the second saw assembly.

5. In a hull extractor for seed cotton and the like, feeder rollers for the seed cotton and hulls, a saw cylinder and a hull board coacting therewith, a stripper and a doffer means coacting with the saw cylinder which is rotated to pass its teeth upwardly through the seed cotton, a second saw cylinder driven like the first and having a hull board to direct into engagement therewith seed cotton and hulls doffed from the first mentioned saw cylinder, stripping and doffing means coacting with the cotton and hulls carried by the second saw cylinder, and a supplemental hull board disposed to catch the hulls and trash discharged between said saws and their said respective hull boards and direct same into contact with the said second saw cylinder for a final treatment.

6. In a hull extractor for seed cotton and the like, feeder rollers for the seed cotton and hulls, a saw cylinder and a hull board and huller roller coacting therewith, a stripper and a doffer means coacting with the saw cylinder which is rotated to pass its teeth upwardly through the seed cotton, a second saw cylinder driven like the first and having a hull board to direct into engagement therewith seed cotton and hulls doffed from the first mentioned saw cylinder, stripping and doffing means coacting with the cotton and hulls that are directed into engagement with the second saw cylinder, and a supplemental hull board means disposed to catch the hulls escaping past said hull boards for both saw cylinders and direct same into contact with the second saw cylinder for final treatment before their discharge.

7. In a machine for separating hulls and trash from cotton and the like, the combination of two hull removing agencies arranged and adapted to act successively on the main cotton stream in its traverse of the machine, each agency comprising means to engage the cotton to separate it from the hulls and to discharge the cotton and hulls separately, means to cause the hulls discharged by each of said agencies together with such cotton as tends to escape with the hulls to move in separate streams along converging paths, and a rotatable element disposed to act on the cotton in both hull streams to restore it to the cotton engaging means of one of said agencies.

8. In a machine for separating hulls and trash from cotton and the like, the combination of a primary and a secondary saw cylinder adapted to act successively on the main cotton stream, means to feed mixed cotton and hulls to the primary saw cylinder, means to cause the discharge of hulls from the cotton stream past each of said saw cylinders, means to cause the two hull streams to pass on opposite sides of one of said saw cylinders, and means disposed to act on both of said hull streams to restore cotton passed to waste therewith to one of said saw cylinders to be returned thereby to the cotton stream.

9. In a machine for separating hulls and trash from cotton and the like, the combination of a main saw cylinder and a secondary saw cylinder, means to feed mixed cotton and hulls to the main saw cylinder, means to deliver the main cotton stream from said first mentioned saw cylinder to said secondary saw cylinder, means to cause the discharge of hulls past each saw cylinder in separate streams, one hull stream passing under one of the saw cylinders toward the other hull stream, and means disposed to act on both hull streams to restore cotton passing into waste therewith to one of said saw cylinders.

10. In a machine for separating hulls and trash from cotton and the like, a cotton separating agency comprising an initial saw cylinder, a stripper, a doffer and means to permit the escape of hulls and trash with some entrained cotton separately from the main cotton stream, a second cotton separating agency which receives the cotton stream doffed from said initial saw cylinder and comprising a saw cylinder, a stripper and a doffer which act on said cotton streams, and means to permit the escape of hulls and trash with some entrained cotton, a rotating element interposed in the path of the cotton hulls and trash rejected by both of said separating agencies and acting to cause the cotton in the several hull streams to be returned to one of said saw cylinders.

11. In a cotton separating and cleaning machine, two units for separating the cotton from the hulls and trash, each unit comprising a saw cylinder having hull rejecting and cotton removing agencies associated therewith, the saw cylinder of the second unit being disposed and adapted to receive the cotton stream removed from the saw cylinder of the first unit, there being provided for each unit a separate discharge for hulls and trash with some cotton mixed therewith past its respective saw cylinder, and means common to the discharge of both units for separating the return cotton from both discharges of hulls to the same saw cylinder.

12. A hull extractor for seed cotton and the like, comprising a main extracting saw associated with means which will remove from the main cotton stream and discharge separately therefrom a stream of hulls comprising some cotton tending to go to waste therewith, a second extracting saw and associated means which receive and act upon the main cotton stream discharged from the main extracting saw to separate therefrom a stream of hulls and trash and discharge same separately from the main cotton stream, and coacting elements interposed in the path of the hulls discharged in both hull streams to effect the reclaiming of cotton therefrom and its return to the main cotton streams.

13. A hull extractor according to claim 12, in which the cotton reclaimed is returned by one of said extracting saws to the main cotton stream.

14. A hull extracting mechanism for seed cotton and the like, comprising two hull extracting assemblies through which the main cotton stream passes and by which the cotton therein is twice treated for the separation therefrom of hulls and trash, and means to cause the return to said cotton stream of cotton that would otherwise go to waste with the hull streams from both of said assemblies.

In testimony whereof I affix my signature.

ALGERNON L. SMITH.